(12) United States Patent
Isamat et al.

(10) Patent No.: US 8,583,465 B1
(45) Date of Patent: Nov. 12, 2013

(54) SUPPLY MANAGEMENT AND REPORTING SYSTEM AND METHOD FOR RESOURCE MANAGEMENT

(75) Inventors: Miguel Jose Isamat, Charlotte, NC (US); Daniel Jacob van der Hoeven, Charlotte, NC (US); Shivani Meadh, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 345 days.

(21) Appl. No.: 12/238,076

(22) Filed: Sep. 25, 2008

(51) Int. Cl.
*G06Q 10/00* (2012.01)
(52) U.S. Cl.
USPC ........ 705/7.12; 705/7.17; 705/7.22; 705/7.24
(58) Field of Classification Search
USPC ................................................ 705/7.11–7.42
See application file for complete search history.

(56) References Cited

U.S. PATENT DOCUMENTS

| | | | | |
|---|---|---|---|---|
| 6,049,776 | A * | 4/2000 | Donnelly et al. | 705/7.14 |
| 7,089,193 | B2 * | 8/2006 | Newbold | 705/7.27 |
| 7,962,358 | B1 * | 6/2011 | Fernandez et al. | 705/7.12 |
| 2003/0126141 | A1 * | 7/2003 | Hassman et al. | 707/100 |
| 2004/0088207 | A1 * | 5/2004 | Fromherz | 705/8 |
| 2004/0138897 | A1 * | 7/2004 | Eapen | 705/1 |
| 2004/0162753 | A1 * | 8/2004 | Vogel et al. | 705/10 |
| 2004/0267589 | A1 * | 12/2004 | Wallman | 705/9 |
| 2005/0004825 | A1 * | 1/2005 | Ehrler et al. | 705/8 |
| 2005/0222884 | A1 * | 10/2005 | Ehret et al. | 705/8 |
| 2006/0015376 | A1 * | 1/2006 | Sattler et al. | 705/5 |
| 2007/0038494 | A1 * | 2/2007 | Kreitzberg et al. | 705/8 |
| 2007/0043603 | A1 * | 2/2007 | Andersen et al. | 705/9 |
| 2007/0073576 | A1 * | 3/2007 | Connors et al. | 705/10 |
| 2007/0083412 | A1 * | 4/2007 | Sternaman et al. | 705/8 |
| 2007/0219840 | A1 * | 9/2007 | Rabb et al. | 705/8 |
| 2007/0233534 | A1 * | 10/2007 | Martin et al. | 705/7 |
| 2007/0233546 | A1 * | 10/2007 | Guevremont et al. | 705/9 |
| 2007/0260502 | A1 * | 11/2007 | Motwani et al. | 705/9 |
| 2008/0103868 | A1 * | 5/2008 | Santos et al. | 705/9 |
| 2008/0140485 | A1 * | 6/2008 | Williams | 705/7 |

(Continued)

OTHER PUBLICATIONS

Resource Management Data—Office 2007 (Microsoft), retrieved on Feb. 24, 2011 (http://msdn.microsoft.com/en-us/library/ms423156(v=office.12).aspx) Date of publication: unknown.*

(Continued)

*Primary Examiner* — Gurkanwaljit Singh
*Assistant Examiner* — Sujay Koneru
(74) *Attorney, Agent, or Firm* — Michael A. Springs; Moore & Van Allen, PLLC; Andrew D. Gerschutz

(57) ABSTRACT

A method, system, computer program product, or a combination of the foregoing and apparatus for developing and maintaining a resource plan and allocating resources to the projects within the resource plan. A user interface allows adding, editing, or deleting of resources and a drag and drop feature for allocating a resource to a project, thus making resource planning and management easy, intuitive, and cost-effective for resource managers or other users. Resource plans or groups of resources may be checked out when edited, thus preventing other users from allocating the same resources to different projects. The resources plans are displayed in a plurality of dashboards that summarize the resource plan in a number of ways, including by resource plan, project, group, resource, cost, demand, capacity, and in graphical form. Users have the ability to narrow the display of the dashboards by resource plan, project, group, resource, or timeframe.

24 Claims, 14 Drawing Sheets

(56) References Cited

U.S. PATENT DOCUMENTS

| | | | |
|---|---|---|---|
| 2008/0243575 A1* | 10/2008 | Weinberger | 705/8 |
| 2009/0119144 A1* | 5/2009 | Goyal | 705/8 |
| 2009/0222299 A1* | 9/2009 | Clemenson et al. | 705/7 |
| 2009/0234699 A1* | 9/2009 | Steinglass et al. | 705/9 |
| 2009/0254906 A1* | 10/2009 | Zhang et al. | 718/101 |
| 2010/0004972 A1* | 1/2010 | Harel et al. | 705/9 |
| 2010/0076803 A1* | 3/2010 | Deo et al. | 705/8 |

OTHER PUBLICATIONS

"Project Portfolio Management and Multi-Project Monitoring and Reporting" (2003) The Campana & Schott Group (www.visibleapplauseonline.com/file/Sample.pdf).*

Wolf, "Project and Project Portfolio Management with SAP" (2002) SAP.*

Microsoft Office Project Portfolio Server 2007 (Sep. 2006) Microsoft.*

Microsoft Office Project Server 2007 (2006) Microsoft.*

\* cited by examiner

Figure 1: SMART Resource Planning Process Flow Diagram

SUPPLY MANAGEMENT AND REPORTING SYSTEM AND METHOD FOR RESOURCE MANAGEMENT

FIELD

This invention relates generally to the field of resource management, and more particularly, embodiments of the invention relate to systems, methods, and computer program products for developing and maintaining a resource plan and allocating resources to the projects within the resource plan.

BACKGROUND

As known, resource management consists of efficiently and effectively identifying, tracking, and utilizing a business' resources. Businesses have implemented resource management plans to help track and allocate different types of resources, including but not limited to, financial, inventory, production, technology, and human resources. One particularly important resource is human resources.

Human resource management consists of allocating human hours or percentages of time to projects and/or business units. Through human resource management, a business may maximize the use of personnel to improve efficiency and reduce costs by identifying projects, the technical needs of those projects, staffing needs, staffing availability, and staffing allocation to provide efficient and effective deployment of a business' personnel resources. It is not enough that the resources are allocated to the appropriate projects, but they must be allocated in the proper amount and for the proper duration of time. Human resource management includes estimating and deploying the time of each resource to specific projects. Both estimating and deploying resources are essential components of a comprehensive resource management plan to execute and monitor a project successfully. There are resource management software tools available that automate and assist the process of resource allocation to projects. These products are often too narrowly tailored to provide the proper functionality and security, or too complex and constrained to provide cost-effective and beneficial resource management. Often, resource managers are faced with having to determine the resource allocations, while also defining the project requirements and timetables.

It is desirable to develop a system and associated method for using the system that makes resource planning and management easy, intuitive, and cost-effective for resource managers or other users.

BRIEF SUMMARY

Embodiments of the present invention address the above needs and/or achieve other advantages by providing a method, system, computer program product, and apparatus, or combination of the foregoing for developing and reviewing a resource plan.

One embodiment of the invention is a method for developing a resource plan. The method comprises receiving a user input selecting a resource from a plurality of resources; then receiving a user input selecting a project from a plurality of projects; next, receiving a user input associating the resource with the project; then displaying an available capacity of the selected resource and a demand of the selected project, next, receiving a user input allocating a portion of the capacity of the resource to the associated project; then displaying a remaining demand for the project where the remaining demand is the demand reduced by the portion of the capacity of the resource allocated to the project; and finally, displaying a remaining capacity for the resource, where the remaining capacity is the capacity reduced by the portion of the capacity of the resource allocated to the project.

In further accord with an embodiment of the invention, the method comprises receiving a user input checking out the resource plan from a datastore. To check out the resource plan, the user has previously been granted access to edit that resource plan. Checking out the resource plan prevents other users from making changes to the resource plan until the resource plan is checked back in.

In another embodiment of the invention, the method comprises receiving a user input checking out a group from a datastore. Checking out a group prevents other users from allocating the resources in the group to a project in any resource plan until the group is checked back in.

In one embodiment of the invention, the method comprises receiving a user input to add a new resource plan to a datastore.

In another embodiment of the invention, the method comprises receiving a user input to add a new resource to a datastore.

In further accord with an embodiment of the invention, when receiving a user input to add a new resource to the datastore, the method further comprises receiving a user input to add a name of the resource, a resource identification number, a resource type, a vendor type, or a fix-bid timeframe associated with the resource.

In one embodiment of the invention, the method further comprises receiving a user input to add a project to the resource plan.

In another embodiment of the invention, the method further comprises receiving a user input allocating a cost for a milestone in a project.

In another embodiment of the invention, the method comprises receiving a user input defining a unit of measurement to the resource's capacity that is being allocated to the project in the resource plan.

In one embodiment of the invention, the method comprises receiving a user input defining a time period over which the resource's capacity will apply.

In another embodiment of the invention, receiving a user input associating the resource with the project further comprises the method of dragging the resource out of the plurality of resources and dropping the resource into the project or group in a resource plan.

Another embodiment of the invention is a system for allocating resources to projects. The system allows a user to develop and review a resource plan. The system comprises a computer-readable medium providing computer-readable instructions, a display device, a user interface device, and a processor. The processor is operatively coupled to the display device, the user interface device, and the computer-readable medium. The processor is configured to execute the computer-readable instructions to perform a number of operations. The processor uses the user interface device to receive a user input selecting a resource from a plurality of resources and a project from a plurality of projects. The processor uses the user interface device to receive a user input associating the resource with the project. The processor uses the display device to display an available capacity of the selected resource and a demand of the selected project. The processor uses the user interface device to receive a user input allocating a portion of the capacity of the resource to the associated project. The processor uses the display device to display a remaining demand for the project. The remaining demand is the demand reduced by the portion of the capacity of the resource allocated to the project. The processor also uses the display device to display a remaining capacity for the resource. The remaining capacity is the capacity reduced by the portion of the capacity of the resource allocated to the project.

In further accord with one embodiment of the invention, the processor uses the user interface device to receive a user input to check out a resource plan or a group. Checking out the resource plan or group prevents other users from making changes to the resource plan or allocating the group's resources to a resource plan until the resource plan or the group is checked back in.

In another embodiment of the invention, the processor uses the user interface device to receive inputs to define a unit of measurement for the resource capacity being allocated to the resource plan.

In one embodiment of the invention, the processor uses the user interface device to receive inputs to define a time period over which the resource plan will occur.

In one embodiment of the invention, the processor uses the user interface device to receive inputs to add resources to the available resources in a group. Adding resources comprises adding a name of the resource, a resource identification number, a resource type, a vendor type, or a fix-bid timeframe for the resource.

In another embodiment of the invention, the processor uses the user interface device to receive inputs to edit or delete a resource stored in the resource plan.

In one embodiment of the invention, the processor uses the user interface device to receive inputs to allocate a plurality of resources categorized in a group to the project in the resource plan.

In another embodiment of the invention, the processor uses the user interface device to receive inputs to allocate a cost associated with the resource or a group of resources to a milestone in the project. The cost will determine the capacity allocated for the resource or the group of resources to the project milestone.

In another embodiment of the invention, the processor uses the display device to display information about the resource plan. The information is the project and associated resources for the resource plan. The display is a user interface of a resource plan summary, a capacity vs. demand chart, a resource hours and cost view, an allocation roll-up, a capacity summary, a demand summary, a resource level view, a remaining allocation view, or a fix-bid summary.

In further accord with one embodiment of the invention, the processor uses the display device to display information about the resource plan and uses the user interface device to receive inputs to select the groups to be displayed or the time period to be displayed. The groups or time period inputted will determine what information is displayed in a resource plan summary, a capacity vs. demand chart, a resource hours and cost view, an allocation roll-up, a capacity summary, a demand summary, a resource level view, a remaining allocation view, or a fix-bid summary.

In one embodiment of the invention, the processor uses the user interface device to receive inputs for allocating the resource to the project by dragging and dropping the resource into the desired project.

Another embodiment of the invention is a computer program product for developing and reviewing a resource plan. The computer program product comprises at least one computer-readable medium having computer-readable program code portions embodied therein. The computer-readable program code portions comprise a first executable portion and a section executable portion. The first executable portion is configured for receiving inputs, from a user through a user interface device, for allocating a resource to a project within the resource plan. The second executable portion is configured for generating a dashboard, through a display device, for displaying the capacity associated with the resource and the demand associated with the projects.

In further accord with an embodiment of the invention, the computer program product comprises an executable portion configured for receiving inputs from the user, through the user interface device, for allocating the resource's capacity to a project.

In another embodiment of the invention, the computer program product comprises an executable portion configured for receiving inputs from the user, through the user interface device, for allocating the resource's cost to complete a milestone of the project to the project.

In one embodiment of the invention, the computer program product comprises an executable portion configured for generating the dashboard, through the display device, for displaying a resource plan report. The resource plan report comprises at least one of a resource plan summary, a capacity vs. demand chart, a resource hours and cost view, an allocation roll-up, a capacity summary, a demand summary, a resource level view, a remaining allocation view, or a fix-bid summary.

In one embodiment of the invention, the computer program product comprises an executable portion configured for receiving inputs from the user, through the user interface device, for allocating the resource to a project by dragging and dropping the resource into the project within the resource plan.

In another embodiment of the present invention, the computer program product is a web-based collaborative program that allows a plurality of users to develop and review a resource plan over the web.

Another embodiment of the invention is a method of tracking a resource plan. The method comprises tracking a resource plan that comprises a project, and the project comprises a resource; then monitoring the resource plan through a resource plan summary, a capacity vs. demand chart, a resource hours and cost view, an allocation roll-up, a capacity summary, a demand summary, a resource level view, a remaining allocation view, or a fix-bid summary.

In further accord with one embodiment of the invention, the method of tracking a resource plan further comprises creating the resource plan being tracked by inputting data into a user interface.

In one embodiment of the invention, the method of creating the resource plan by inputting data, further comprises checking out a resource plan from a datastore, where a user has been granted access to edit the resource plan. Checking out the resource plan prevents other users from making changes to the resource plan until the resource plan is checked back in. The method further comprises checking out a group resource from a datastore. Checking out the group prevents other users from allocating the group's resources to a project in a resource plan until the group is checked back in.

In another embodiment of the invention, the method of creating the resource plan by inputting data, further comprises allocating at least one resource to at least one project listed in the resource plan.

In one embodiment of the invention, the method of allocating at least one resource to at least one project listed in the resource plan, further comprises dragging the at least one resource out of a list of resources and then dropping the at least one resource into a project or group in the resource plan.

In one embodiment of the invention, the method of creating the resource plan by inputting data, further comprises allocating at least a portion of at least one resource's capacity to at least one project over a period of time.

In another embodiment of the invention, the method of creating the resource plan by inputting data, further comprises adding a new resource to the datastore.

In another embodiment of the invention, the method of adding a resource to the datastore, further comprises adding at least one of a name of the resource, a resource identification number, a resource type, a vendor type, or a fix-bid timeframe associated with the resource.

In one embodiment of the invention, the method of creating the resource plan by inputting data, further comprises allocating a cost for a resource in a project.

In another embodiment of the invention, the method of creating the resource plan by inputting data, further comprises defining a unit of measurement to the resource's capacity that is being allocated to the project in the resource plan, then defining a time period over which the resource plan will occur.

Another embodiment of the invention is a computer program product for developing and reviewing a resource plan. The computer program product comprises a computer-readable medium having computer-readable program code portions embodied therein. The computer-readable program code portions comprise a first and second executable portion. The first executable portion is configured for receiving inputs for allocating a resource to a project within the resource plan. The second executable portion is configured for generating one or more user interfaces to be displayed on a display device. The one or more user interfaces display information regarding the resource allocated.

In one embodiment of the invention, the inputs received by the first executable portion further comprise time input allocations of a resource's time to the project within the resource plan.

In another embodiment of the invention, the inputs received by the first executable portion further comprise cost input allocations of a resource's cost to complete at least part of a project within the resource plan.

In another embodiment of the invention, the user interfaces generated by the second executable portion comprise resource plan reports. The resource plan reports comprise at least one of a resource plan summary, a capacity vs. demand chart, a resource hours and cost view, an allocation roll-up, a capacity summary, a demand summary, a resource level view, a remaining allocation view, or a fix-bid summary.

In further accord with an embodiment of the invention, the computer program product further comprises an executable portion configured for developing the resource plan by dragging and dropping the resource into the project within the resource plan.

In another embodiment of the invention the computer program product is a web-based collaborative program that allows a plurality of users to develop and review a resource plan over the web.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Figure 1:
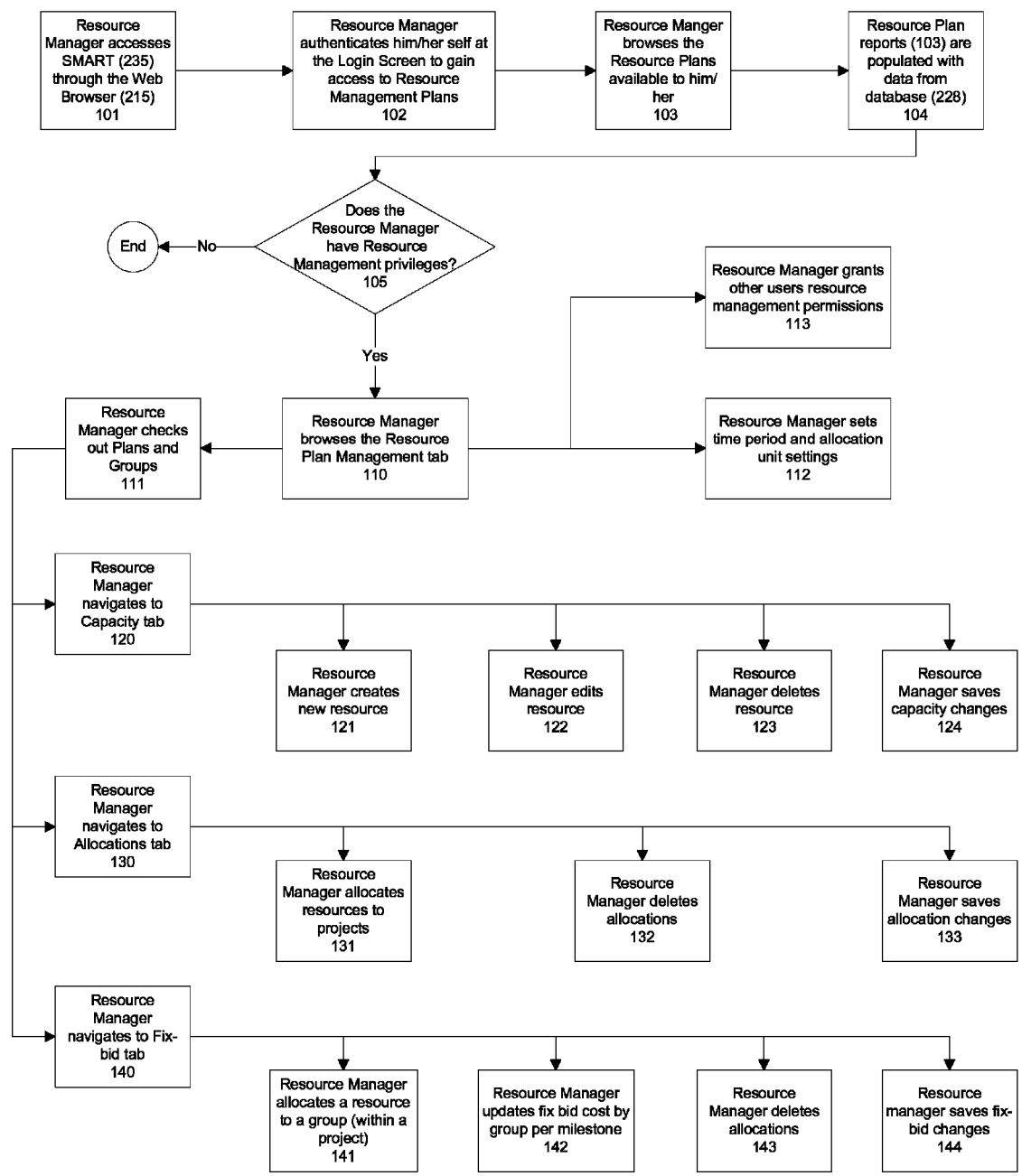
Figure 2:
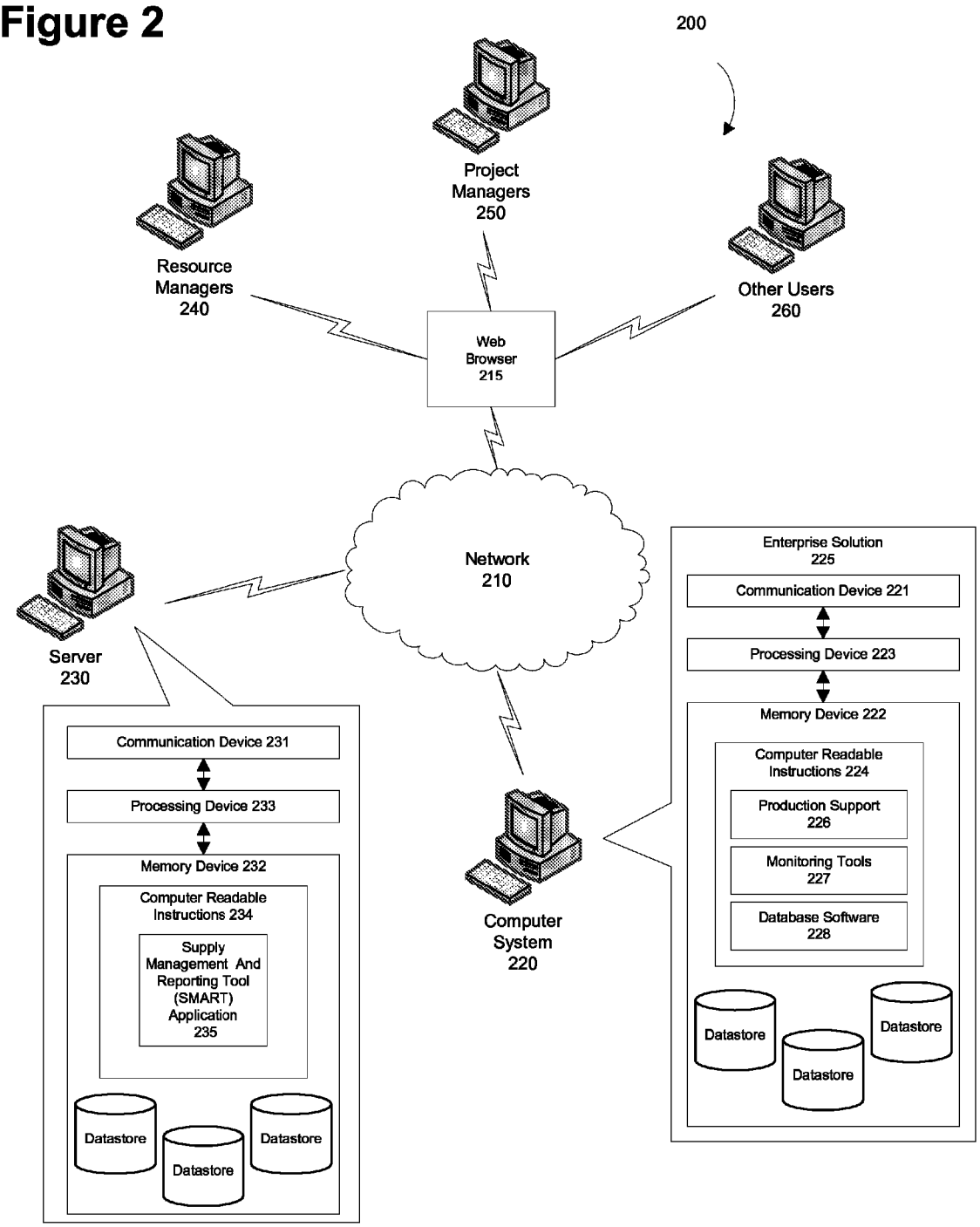
Figure 3:
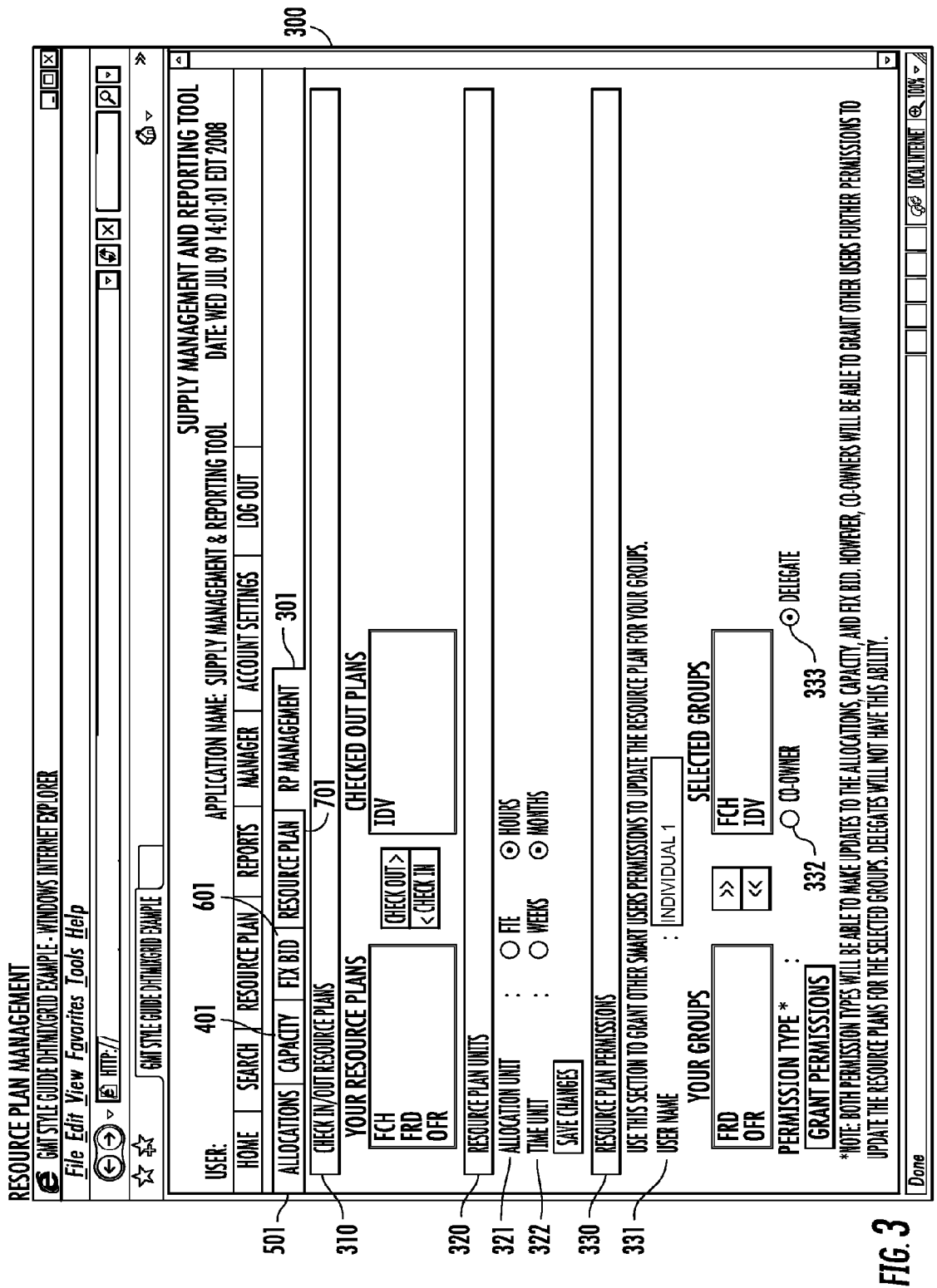
Figure 4:
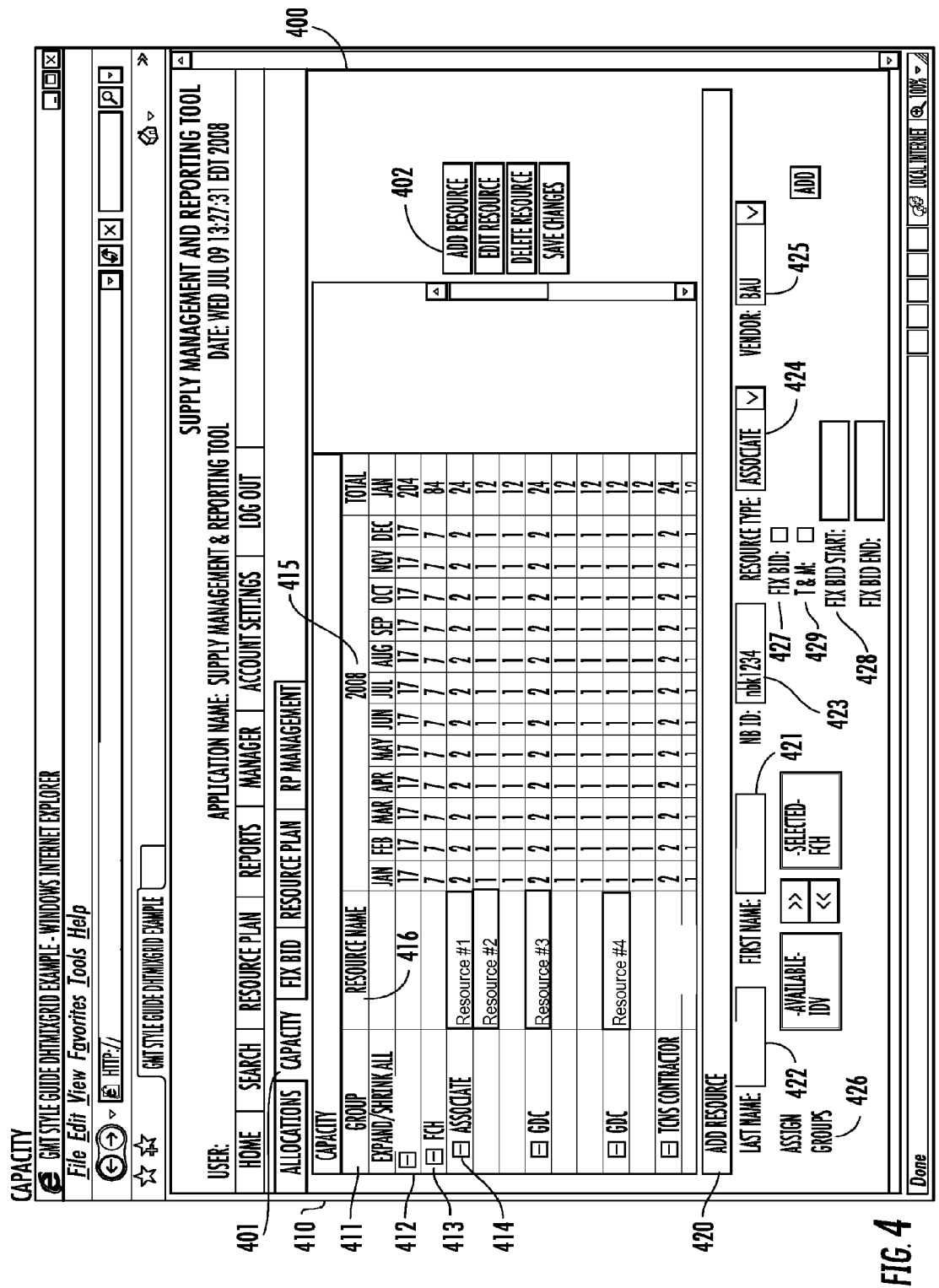
Figure 5:
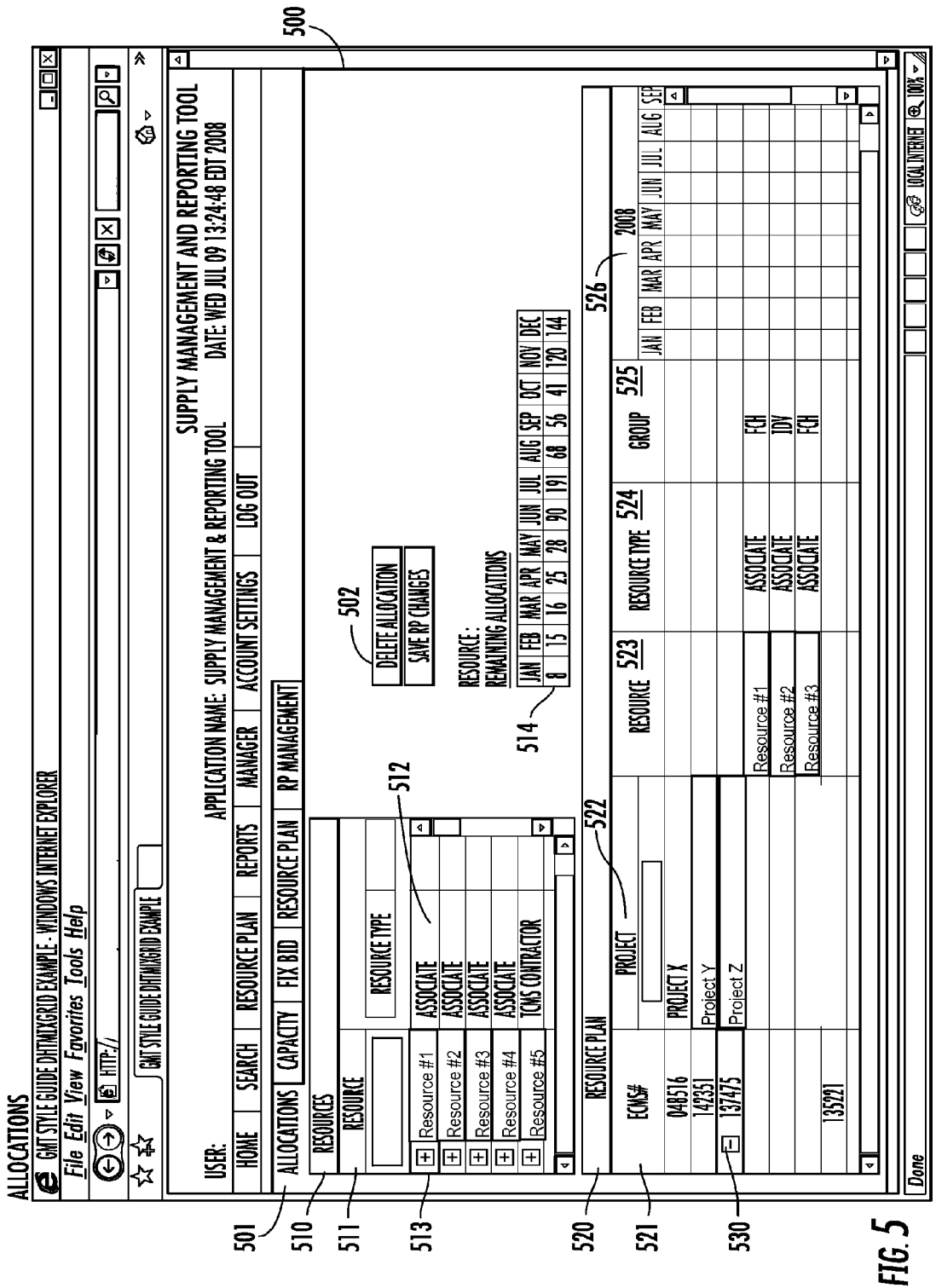
Figure 6:
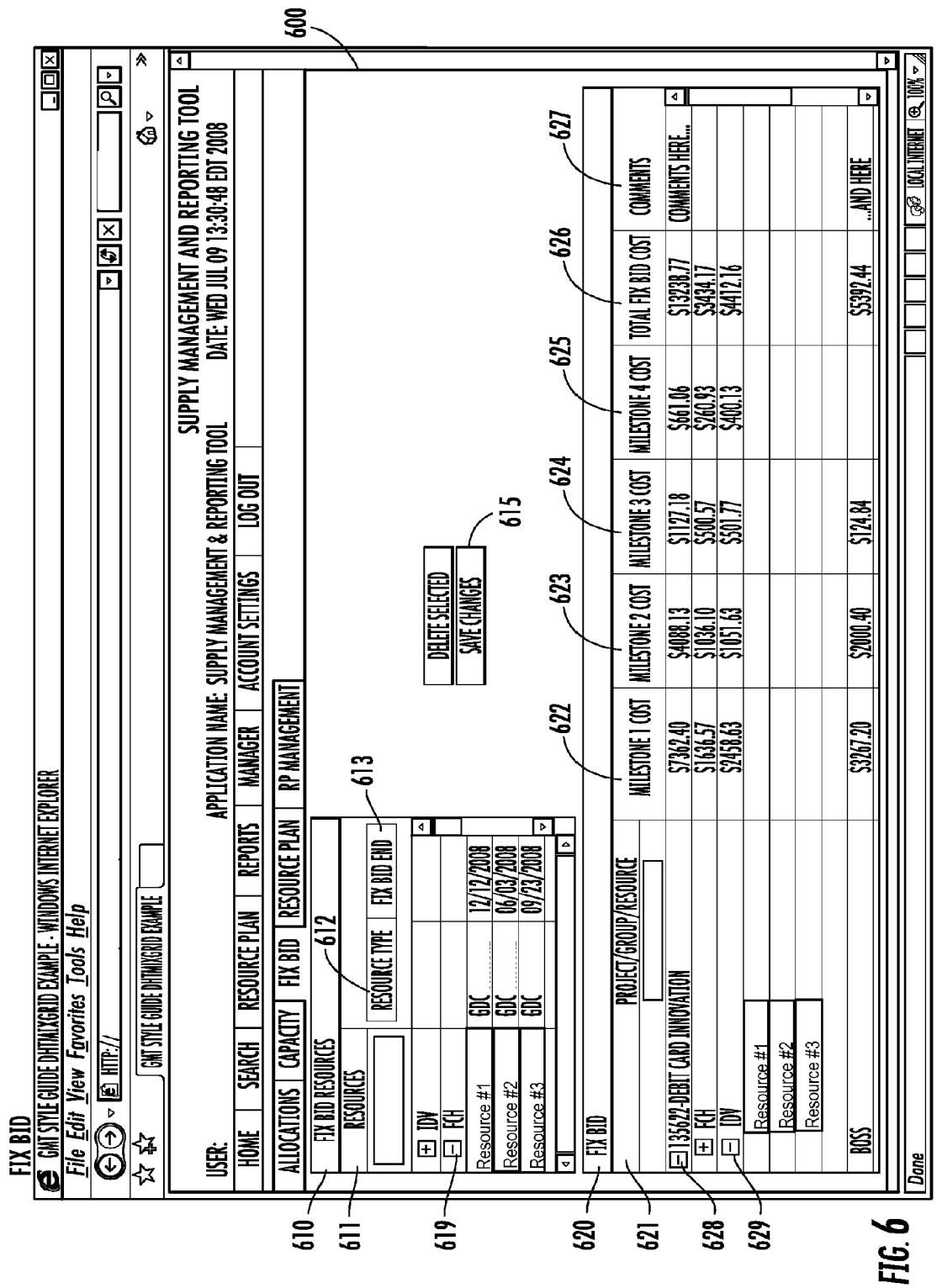
Figure 7:
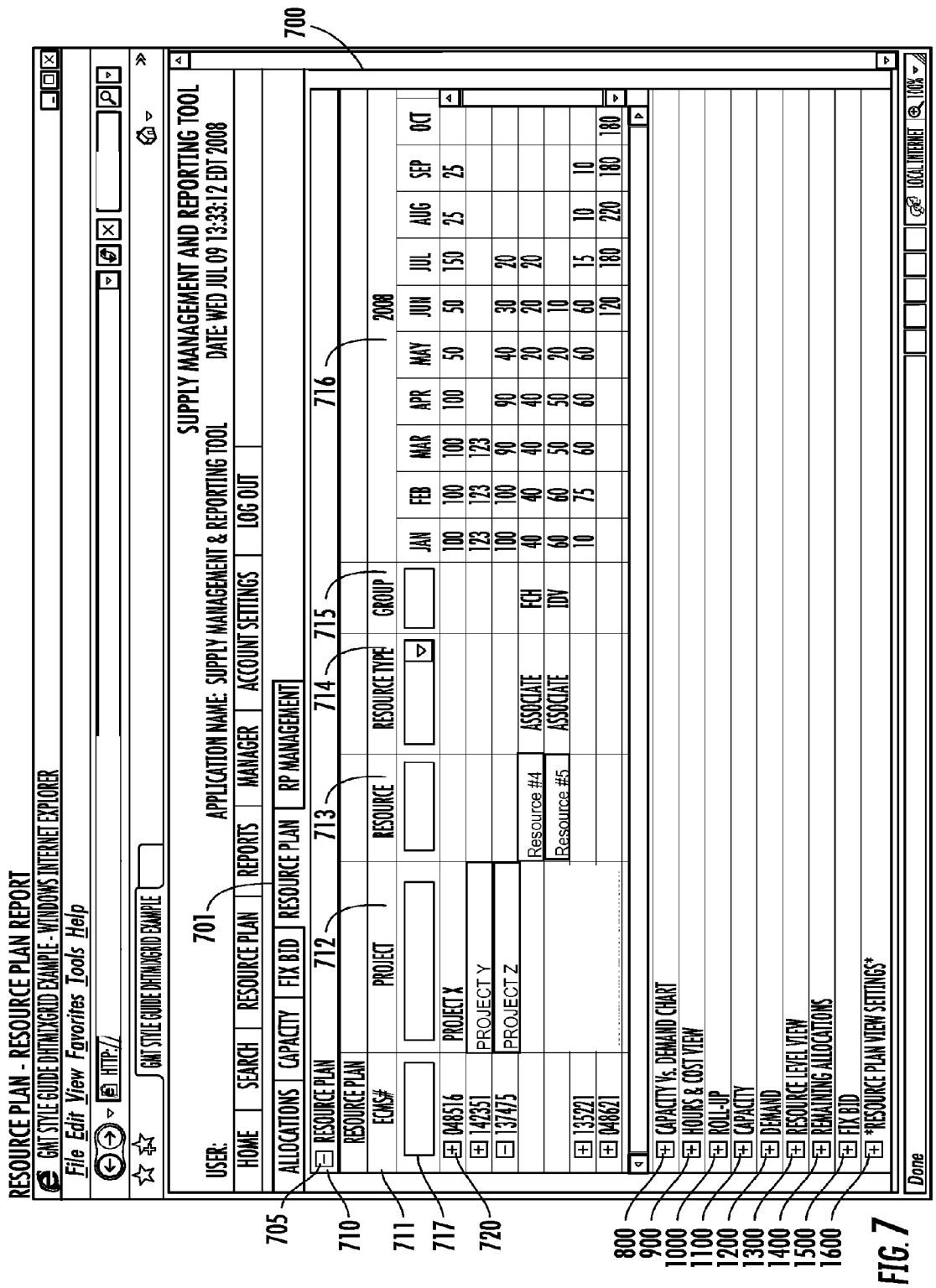
Figure 8:
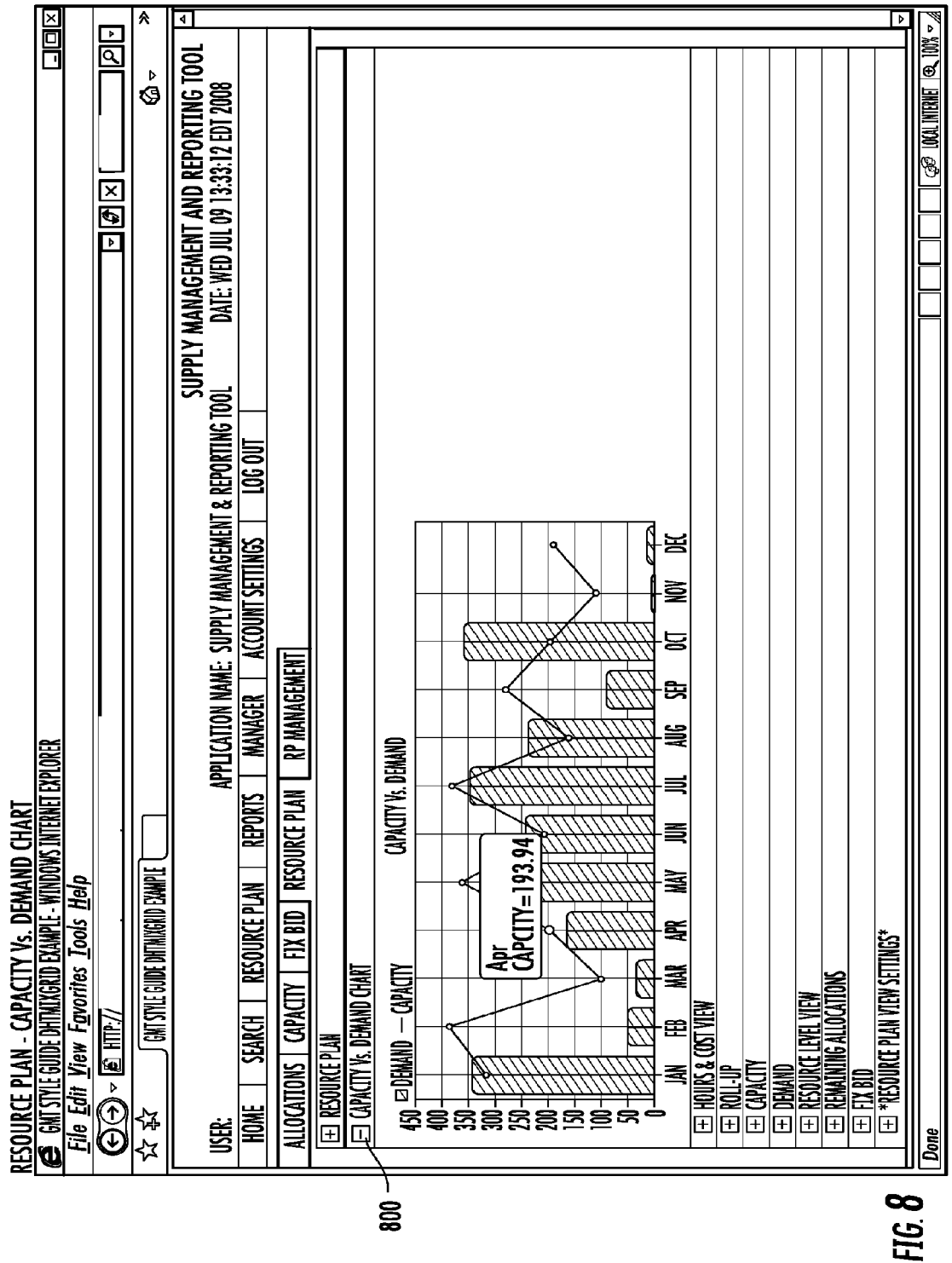
Figure 9:
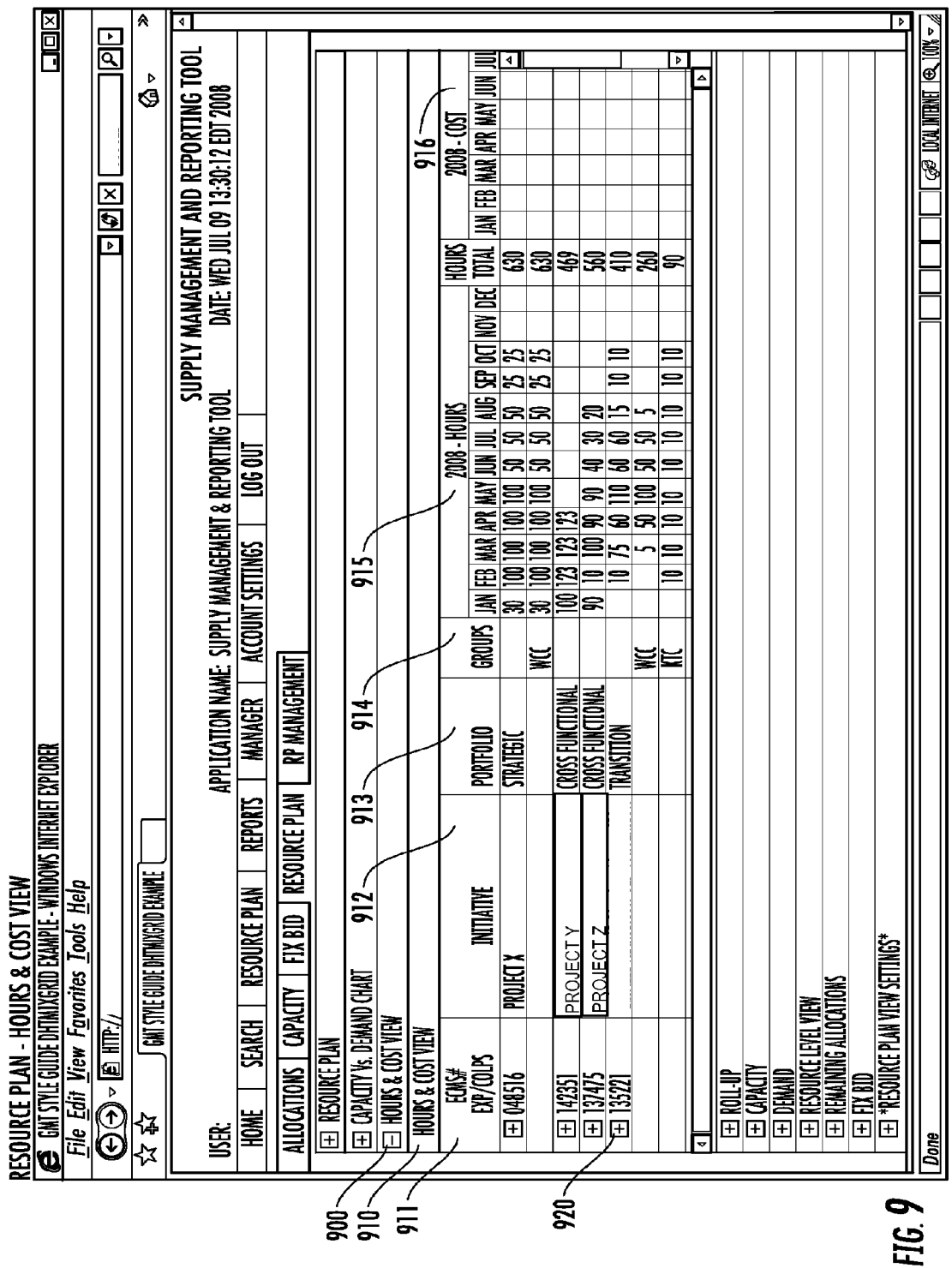
Figure 10:
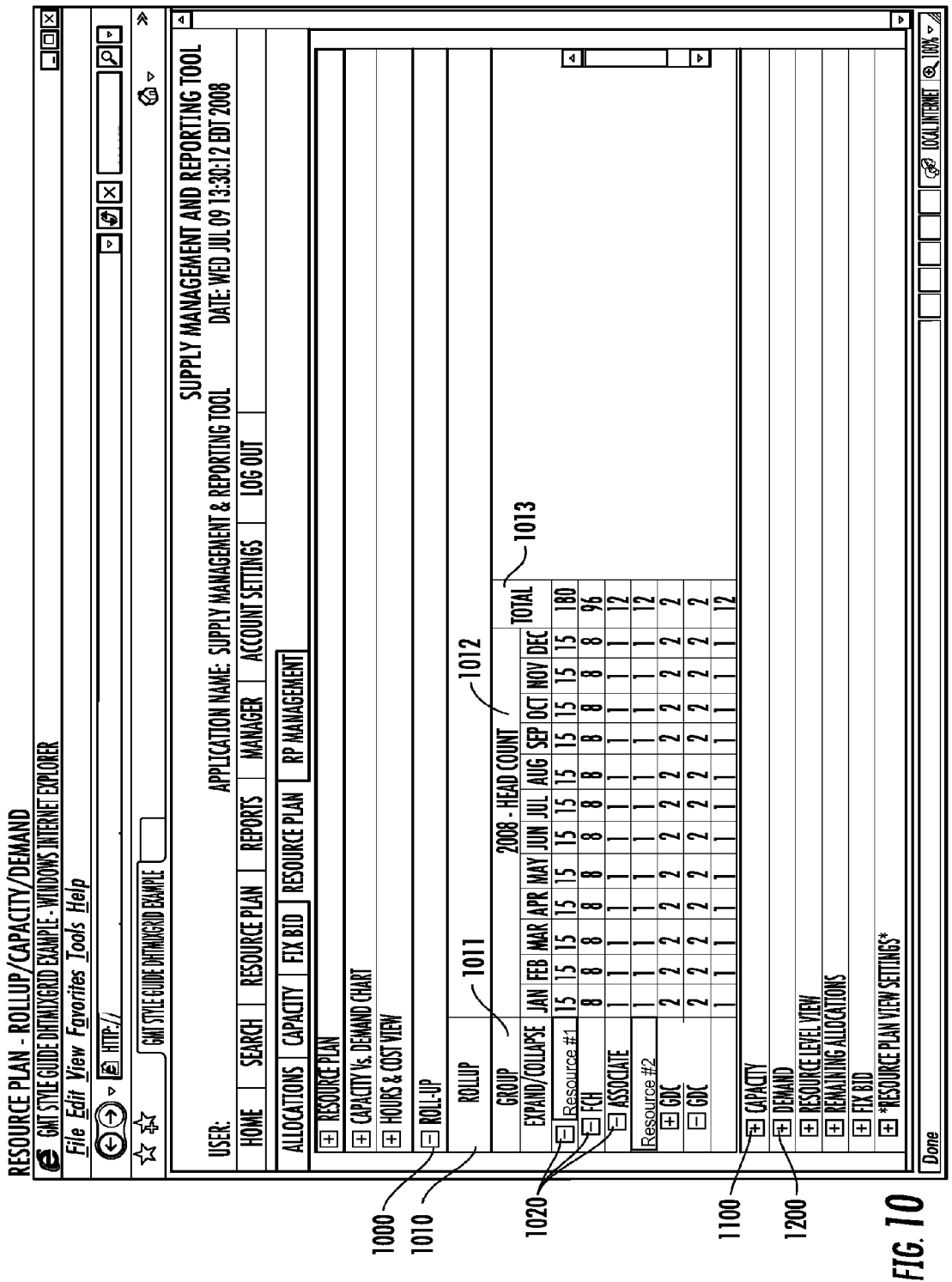
Figure 11:
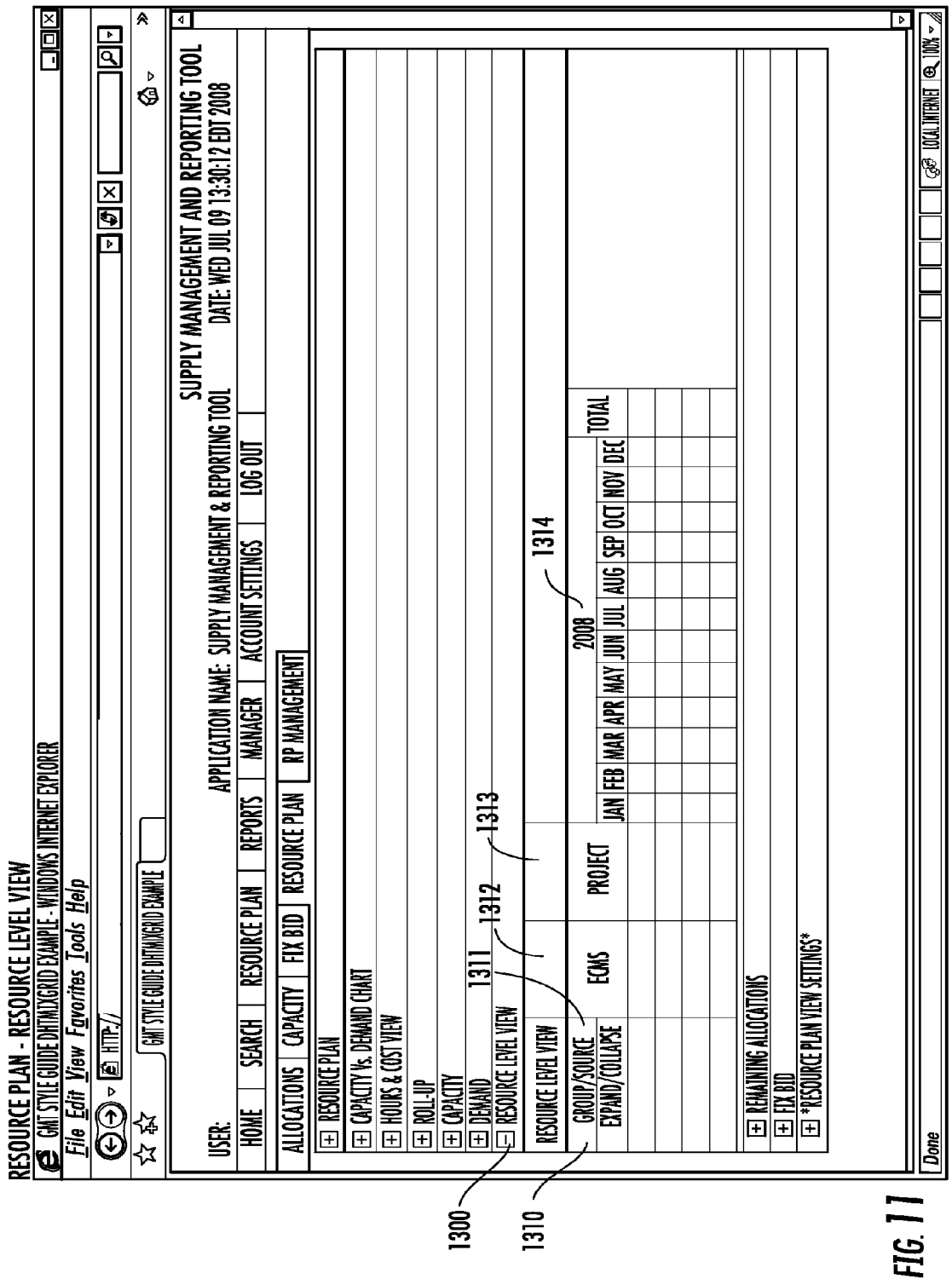
Figure 12:
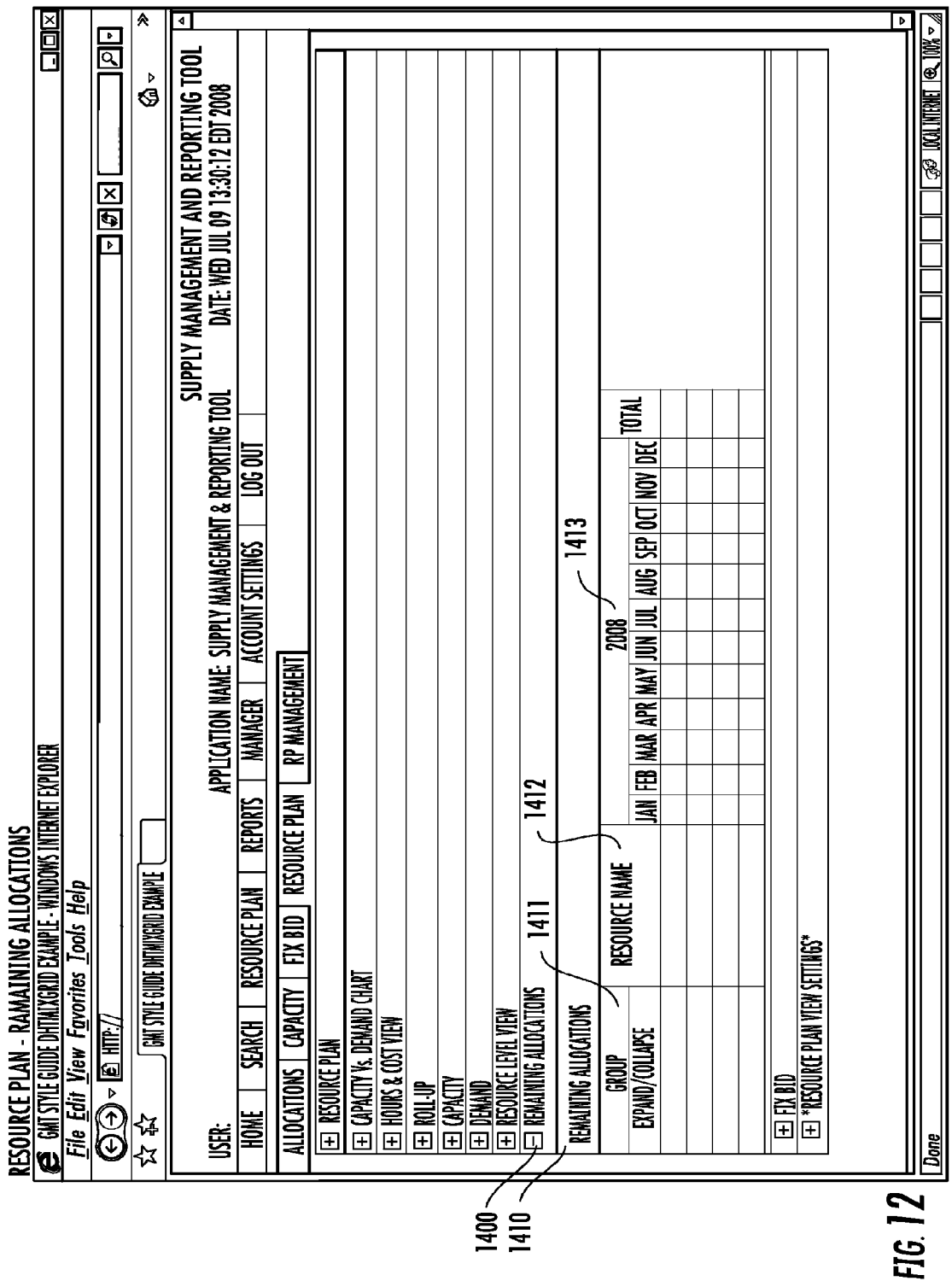

Having thus described embodiments of the invention in general terms, reference will now be made to the accompanying drawings, which are not necessarily drawn to scale, and wherein:

FIG. 1 illustrates a flow diagram outlining the process involved in using the Supply Management and Reporting Tool ("SMART") in accordance with an embodiment of the present invention;

FIG. 2 illustrates an environment in which an embodiment of the present invention exists;

FIG. 3 illustrates a Resource Plan Management dashboard in accordance with an embodiment of the present invention;

FIG. 4 illustrates the Capacity dashboard in accordance with an embodiment of the present invention;

FIG. 5 illustrates the Allocations dashboard in accordance with an embodiment of the present invention;

FIG. 6 illustrates the Fix-Bid Dashboard in accordance with an embodiment of the present invention;

FIG. 7 illustrates the Resource Plan Report in accordance with an embodiment of the present invention;

FIG. 8 illustrates the Resource Plan—Capacity vs. Demand Chart in accordance with an embodiment of the present invention;

FIG. 9 illustrates the Resource Plan—Hours & Cost Report in accordance with another embodiment of the present invention;

FIG. 10 illustrates the Resource Plan—Roll-up, Capacity, and Demand Reports in accordance with an embodiment of the present invention;

FIG. 11 illustrates the Resource Plan—Resource Level View Report in accordance with an embodiment of the present invention;

FIG. 12 illustrates the Resource Plan—Remaining Allocations Report in accordance with an embodiment of the present invention.

Figure 13:
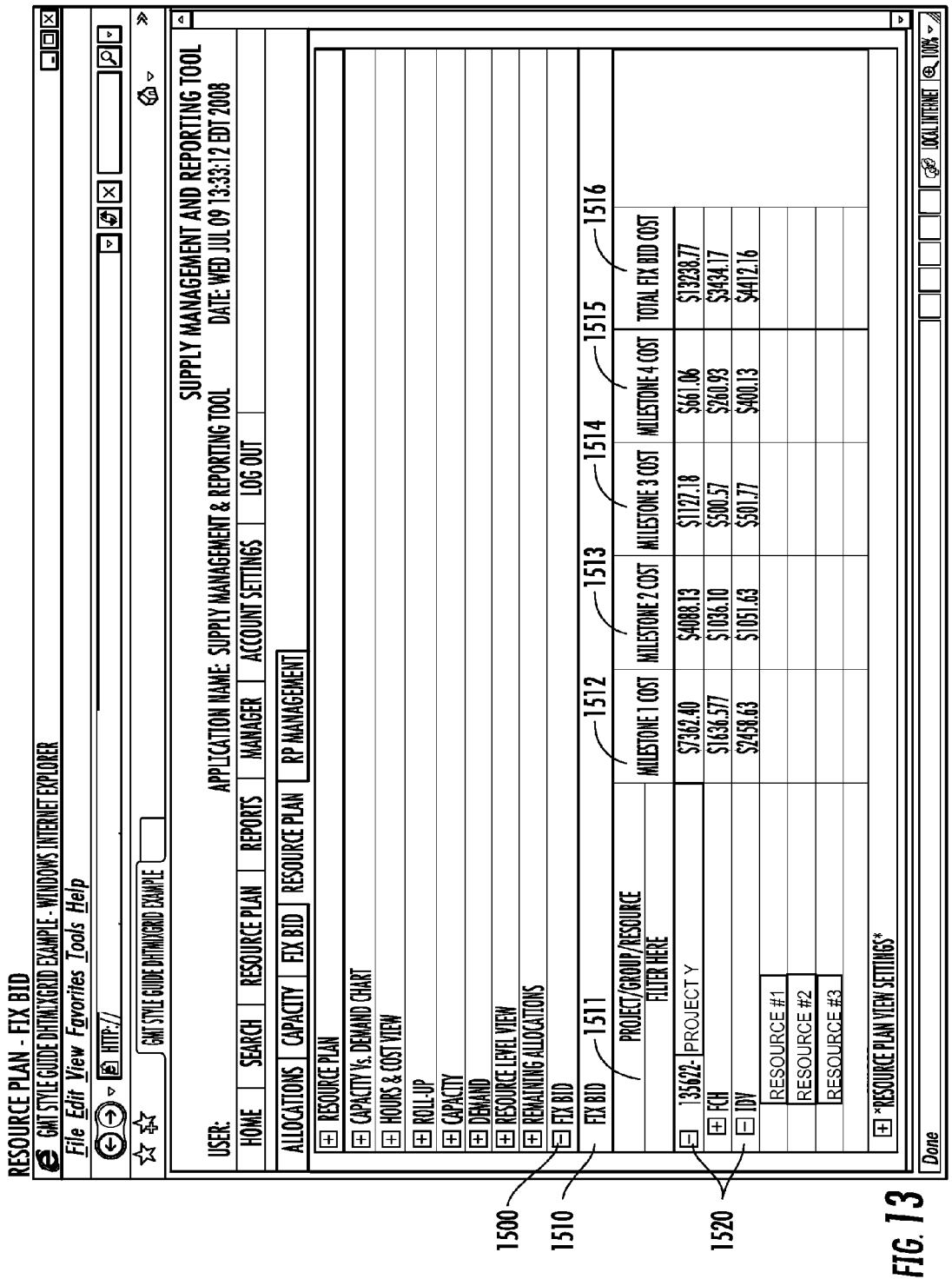

FIG. 13 illustrates the Resource Plan—Fix-Bid Report in accordance with an embodiment of the present invention.

Figure 14:
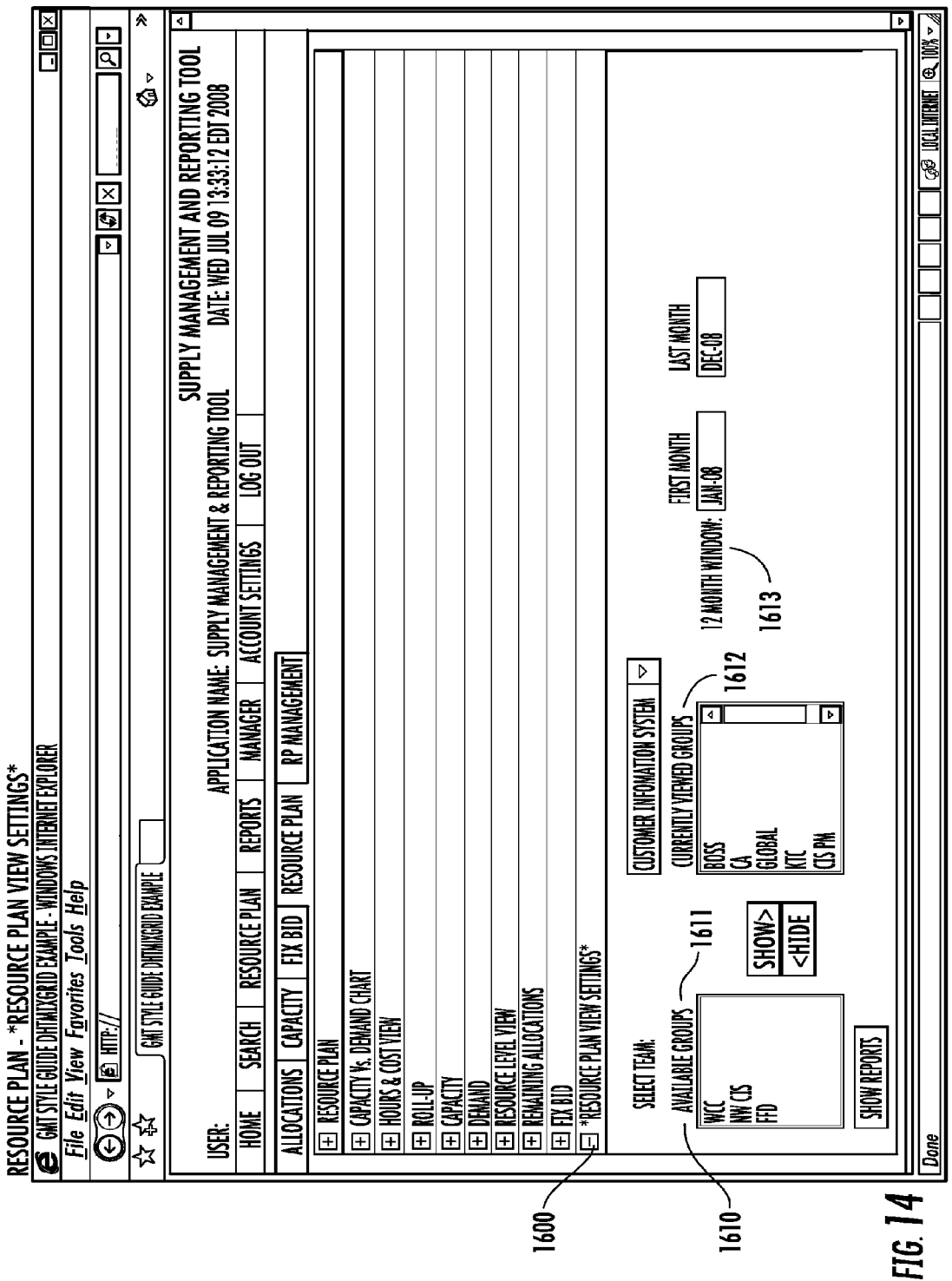

FIG. 14 illustrates the Resource Plan—Resource Plan View Settings in accordance with an embodiment of the present invention.

DETAILED DESCRIPTION OF EMBODIMENTS OF THE INVENTION

Embodiments of the present invention now will be described more fully, hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art, the present invention may be embodied as a method, system, computer program product, or a combination of the foregoing. Accordingly, embodiments of the present invention may take the form of an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device; or transmission media such as those supporting the Internet or an intranet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in computer memory.

In the context of this document, a computer-usable or computer-readable medium may be any medium that can contain, store, communicate, propagate, or transport a program for use by or in connection with the instruction execution system, platform, apparatus, or device. The computer-usable medium may include a propagated data signal with the computer-usable program code embodied therewith, either in baseband or as part of a carrier wave. The computer-usable program code may be transmitted using any appropriate medium, including but not limited to the Internet, wireline, optical fiber cable, radio frequency (RF), or other means.

Computer program code/computer-readable instructions for carrying out operations of the present invention may be written in an object oriented, scripted or unscripted programming language such as Java, Perl, Smalltalk, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart, and/or block diagram block or blocks.

These computer program instructions may also be stored in a computer-readable memory that can direct a computer or other programmable data processing apparatus to function in a particular manner, such that the instructions stored in the computer-readable memory produce an article of manufacture, including instruction means which implement the function/act specified in the flowchart, and/or block diagram block or blocks.

The computer program instructions may also be loaded onto a computer or other programmable data processing apparatus to cause a series of operational steps to be performed on the computer or other programmable apparatus to produce a computer implemented process, such that, the instructions which execute on the computer or other programmable apparatus, provide steps for implementing the functions/acts specified in the flowchart, and/or block diagram block or blocks. Alternatively, computer program implemented steps or acts may be combined with operator or human implemented steps or acts in order to carry out an embodiment of the invention.

Embodiments of the present invention further provide a plurality of Resource Plan User Interfaces ("UI") to be displayed using a display device communicatively coupled to a computing device. The figures provided herein illustrate examples of such UIs. These UIs are generated and operated by a processor executing computer-readable program instructions embodied in a computer-readable medium.

FIG. 1 provides a flow diagram illustrating the SMART Resource Planning Process and FIG. 2 illustrates a Resource Planning environment. The environment will allow managers to manage their resources. As illustrated in FIG. 2, in one embodiment SMART Resource Planning is a web-based application 235, designed in Java, JavaScript, HTML, AJAX or some other language and stored on a server, alternatively the tool may be in the form of software for loading onto individual computers, or for use over an internal network. In one embodiment, the SMART web application is loaded onto a Web Server 230. The Web Server 230 generally comprises a communication device 231, a memory device 232, and a processing device 233 operatively coupled to the communication device 231 and the memory device 232. The processing device 233 uses the communication device 231 to communicate with the network 210 and ultimately with users of the SMART application 235. As such, the communication device 231 generally comprises a modem, server, or other device(s) for communicating with other devices through the network 210. As further illustrated in FIG. 2, the Web Server 230 includes computer-readable program instructions 234 stored in the memory device 232, which includes the computer-readable program instructions 234 of the SMART application 235.

As described in greater detail below, the SMART application 235 presents real-time information, including but not limited to resource capacity, allocation, and cost, in a way that makes it easy for a user of the SMART application 235 to efficiently and effectively develop a detailed resource plan for multiple projects using resources distributed over a range of groups. The groups are defined by the business and may include any combination of resources sorted by a common characteristic. Furthermore, a resource may belong to more than one group, or a group may contain sub-groups that further define and sort resources by a common characteristic. In one embodiment, the SMART application 235 of the Web Server 230 gets real-time information about the available resources from an Enterprise Solution System 225, which may be operated on the Web Server 230 or, as illustrated in FIG. 2, on another computing system 220.

As illustrated in FIG. 2, the Enterprise Solution System 225 generally comprises a communication device 221, a memory device 222, and a processing device 223 operatively coupled to the communication device 221 and the memory device 222. The processing device 223 uses the communication device 221 to communicate with the network 210. As such, the communication device 221 generally comprises a modem, server, or other device(s) for communicating with other devices on the network 210. As further illustrated in FIG. 2, the Enterprise Solution System 225 includes computer-readable instructions 224 stored in the memory device 222 which includes the computer-readable instructions 224 of the production support 226, monitoring tools 227, and database software 228. In one embodiment of the invention, the Enterprise Solution System 225 comprises the known MySQL Enterprise Solution package offered by Sun Microsystems.

In one embodiment, users, such as resource managers 240, project managers 250, and other users 260, access the SMART application 235 by navigating the network 210 through a Web Browser 215. Users may connect to the Web Browser 215 through the use of a computer system containing a display, mouse, keyboard, microphone, and/or speakers for communicating with one or more users of the systems. From the Web Browser 215, a user may access the SMART application 235 and pull data into the SMART application 235 from the Enterprise Solution System's 225 database software 228.

FIG. 1 provides a flow chart outlining the process users, in this case resource managers, undergo when using the SMART application 235 for one embodiment of the invention. As illustrated by block 101, a Resource Manager 240 may access the SMART application 235 through the Web Browser 215. Once the Resource Manager 240 reaches the application, the Resource Manager 240 will authenticate for access at the log-in page and a request will be submitted to the underlying database software 228, as indicated by block 102. Once the Resource Manager 240 is authenticated, he/she will have access to the data in the database software 228 through an intuitive user interface based on the permissions granted to the Resource Manager 240. Block 103 indicates that the Resource Manager 240 may browse the plurality of resources plans that are tied to that resource manager in the SMART application 235. As illustrated by block 104, the SMART application 235 will populate the reports for the resource plans from block 103 by accessing the Enterprise Solution System 225 database software 228 through the Network 210 and computer system 220. If the Resource Manager 240 doesn't have privileges to access the particular resource plan selected, then the process will end and the Resource Manager 240 will not be allowed to edit that particular resource plan, as illustrated by the decision diamond 105. If, however, the Resource Manager 240 does have privileges, the SMART application 235 will allow the Resource Manager 240 access to the resource plan.

In one embodiment of the invention, the resource management project will have four different sections for input and one section for reporting. All sections will be displayed as tabs in the UI, as seen in FIG. 3. FIG. 3 illustrates one embodiment of the Resource UI. The Resource UI illustrates the five (5) major tabs for one embodiment of the invention, the Resource Plan Management tab 301, the Capacity tab 401, the Allocation tab 501, the Fix Bid tab 601, and the Resource Plan tab 701. Any user of SMART will be able to view the Resource Plan tab 701, but only Resource Managers 240 with the appropriate privileges will be able to see the Allocations 501, Capacity 401, and Resource Plan Management 301 tabs and edit the data within. After the Resource Manager 240 is granted access to the resource plan, the Resource Manager 240 may browse the Resource Plan Management tab 301, as illustrated by block 110. The Resource Plan Management tab 301 has a Resource Plan UI 300 with three zones, one for Checking in/out Resource Plans 310, one for Resource Plan Units 320, and one for Resource Plan Permissions 330.

In the Check in/out Resource Plans 310 zone, the Resource Manager 240 may check in and out his/her specific resource plans in order to avoid collisions and over-writing between users who each have permission to edit the resource plans, as illustrated by block 111. Furthermore, within the Resource Plan Units 320 zone, the Resource Manager 240 may select the units for their allocation 321, in this case between either full-time employee percentages ("FTE") or hours, as illustrated by block 112, with hours being the default selection. Additionally, as illustrated by block 112, the Resource Manager 240 may set the time period 322 he/she wants to view, in this case between weeks and months, with months being the default selection. In other embodiments of the invention different units, or time periods may be available and selected. In the Resource Plan Permissions 330 zone, the Resource Manager 240 may grant other SMART users permission to update the resource plan for the Resource Manager 240's groups, as illustrated by block 113. In one embodiment of the invention, the resource manager may allow specific users 331 access to the resource plan as either a Co-owner 332 or a Delegate 333. Both types will be able to make updates to the Capacity 401, the Allocations 501, and the Fix-bid 601 tabs, however, co-owners 332 will be able to grant other users further permissions to update the resource plans, and the delegates 333 will not. Once a resource manager has checked out at least one group for resource planning, the Capacity 401, Allocation 501, and Fix-bid 601 tabs will be available to fill out or edit. While a group is checked out, no other resource manager will be able to update the capacity, allocations, or fix-bid data for that particular group until it is checked back in under the Resource Planning Management UI 300.

Next, the Resource Manager may navigate to the Capacity tab 401, as illustrated by block 120. The Capacity tab 401, as illustrated in FIG. 4, includes a Capacity UI 400 with a Capacity zone 410 and an Add Resource zone 420. In the Add Resource zone 420, a Resource Manager may manage the availability of the resources that will eventually be applied to projects, and stores any changes in the Enterprise Solution System 225 database software 228. As illustrated by blocks 121-123, the Resource Manager may create, edit, and delete resources using the click-buttons 402 and the Add Resource zone 420 in the Capacity UI 400. The Resource Managers will be able to enter or edit the following information for each resource: First Name 421, Last Name 422, Employee ID 423, Resource Type 424, Vendor 425, and Groups 426 to which the resource belongs. The Resource Manager 240 also indicates if the resource is a Fix-bid 427. If the resource is a Fix-bid, the Resource Manager 240 indicates when the Fix-bid period begins and ends 428, as well as entering if the resource is a Time and Materials ("T&M") resource, which is a form of cost plus pricing in which price is determined by reference to the cost of the labor and material inputs to the product or service. After resources are created, edited, or deleted, the Resource Manager 240 may save the changes to the Capacity tab 401 using the save changes click-button 402. In the Capacity zone 410 all the resources will be displayed on a grid using a tree structure 411, which will group the resources 416 by resource manager 412, then by group 413, then by resource type 414. The grid 415 will display the capacity information for each Resource Manager, Group, and Resource if it has already been entered.

After creating the resources in the Capacity tab 401, the Resource Manager 240 may navigate to the Allocations tab 501, as illustrated by block 130. The Allocations tab 501, as illustrated in FIG. 5, displays an Allocations UI 500 with two grids, one in the Resources zone 510 and one in the Resource Plan zone 520. The Resource Manager may allocate resources, delete allocations, and save the allocation changes, as represented by blocks 131-133 in FIG. 1, by using the click-buttons 502 in the Allocations UI 500. The grid in the Resources zone 510 contains a list of resources entered into the Capacity UI 400. The Resources zone 510 lists the Resource name 511, the associated Resource Type 512 to which the resource belongs, and a table listing the remaining allocations 514 for the selected resource over the next twelve months. The Resource name 511 column in the Resources zone 510 will act as a tree structure where users can choose to hide or display the resources under each group by selecting the drill-down buttons 513.

The grid in the Resource Plan zone 520 lists the Enterprise Change Management System ("ECMS") number 521, which is an enterprise-wide project identification number, the Projects 522 in the Resource Plan, the Resources 523 allocated to the Projects 522, the Resource Type 524, the Group 525, and a grid for allocating the time for each Resource projection 526 over the next twelve months. The Resource projections 526 can also be displayed in a weekly format or other time denomination as opposed to the monthly format shown in the Resource Plan zone 520. The ECMS number 521 in the Resource Plan zone 520 will act as a tree structure where users can choose to hide or display the resources under each project by selecting the drill down buttons 530. In one embodiment, Projects are entered through SMART using functionality outside of the Resource Planning system. However, it is understood that in other embodiments of the invention, the Projects 522 may also be entered directly into the SMART application 235 through the Resource Planning system.

In the Allocations UI 500, Resource Managers will be able to select resources from the grid in the Resources zone 510 and drag and drop them into the list of Projects 522 in the grid in the Resource Plan zone 520. This allows the Resource Manager to allocate a particular resource to a particular project. Resource Managers will also be able to adjust the allocations for each one of their resources under each project over a twelve month period by making changes to the Resource projections 526 in the Resource Plan zone 520. In other embodiments of the invention, the resource allocations can be broken down into weekly or other time denominations, as opposed to the monthly time period shown. Resource Managers will also be able to edit and delete existing allocations. Any changes, additions, or deletions made in the SMART application 235 will be stored in the Enterprise Solution System 225 through the database software 228.

After allocating the resources in the Allocations tab 501 the Resource Manager may navigate to the Fix-bid tab 601, as illustrated by block 140. The Fix-bid tab 601 is similar to the Allocations tab 501, as illustrated in FIG. 6. The Fix-bid tab 601 displays a Fix-bid UI 600 with two grids, one in the Fix-bid Resources zone 610 and one in the Fix-bid zone 620. The grid in the Fix-bid Resources zone 610 contains a column for the Resources 611, the Resource Type 612, and the Fix-bid End date 613. The Resources 611 column in the Fix-bid Resources zone 610 will act as a tree structure where users can choose to hide or display the resources under each group by selecting the drill-down buttons 619. The grid will display all groups that were determined as having fix-bid work for each project when the projects are entered. The Resource Manager will be able to allocate resources to a group within a specific project, as illustrated by block 141, by dragging and dropping the group from the Fix-bid Resources zone 610 into the appropriate Project 621 in the Fix-bid zone 620.

The Fix-Bid zone 620 lists the Project, Group, and Resource 621 in a tree structure where users can choose to hide or display the groups associated with the projects, and the resources associated with the groups and projects, by selecting the drill down buttons 628 and 629. As represented by block 142, a Resource Manager may input or update the Fix-bid cost by group on a per milestone basis. As represented in FIG. 6, the Fix-bid zone 620 lists the Milestone 1 Costs 622, the Milestone 2 Costs 623, the Milestone 3 Costs 624, the Milestone 4 Costs 625, and the Total Fix-bid Cost. Instead of allocations of time, these Milestone sections will allow Resource Managers to specify a dollar amount at a group level under each project over 5 different milestones. The cost allocations can be used to indicate the amount of resources that should be allocated to that particular project or milestone. Resources Managers will also be able to enter Comments 627 to explain the dollar amounts in each of the Milestones. Furthermore, the click-buttons 615 in the Fix-Bid UI 600 are used by the Resource Manager to add, delete, and save any changes to the resource allocations or milestone costs, as illustrated by blocks 143 and 144 in FIG. 1. Again, any changes, additions, or deletions made to the Fix-bid UI 600 in the SMART application 235 will be updated in the Enterprise Solution System 225 through the database software 228.

In one embodiment of the invention, the Resource Manager may examine the collection of multiple reports, based on the data entered by various Resource Managers, on all the projects in the Capacity 401, Allocation 501, and Fix-bid 601 tabs by selecting the Resource Plan tab 701 and navigating through the Resource Plan UI 700. The Resource Plan UI 700 has drill-down buttons 705 for examining details related to a number of different categories including, the Resource Plan Report 710, the Capacity vs. Demand Chart 800, the Hours & Cost View 900, the Roll-up 1000, Capacity 1100, Demand 1200, Resource Level View 1300, Remaining Allocations 1400, and Fix-Bid 1500. When viewing any of the reports in the Resource Plan tab 701, the SMART application pulls the stored data from the Enterprise Solution System 225 using the database software 228.

As illustrated in FIG. 7, in one embodiment of the invention, the Resource Plan report 710 captures all of the projects and the resources allocated, as well as the allocations themselves over a twelve month period. This grid uses a tree structure that allows the users to drill-down into each project to view the individual resources. The Resource Plan Report 710 has columns listing the ECMS#711 of the project, the Project name 712, the associated Resources 713, the Resource Type 714, the associated Group 715 to which the resource belongs, and the twelve month allocation times 716. Furthermore, more detail related to the specific resources within each project may be examined by selecting the drill-down buttons 720. A user may search for information related to a particular project, resource, resource type, group or ECMS# by typing in the associated name in the blank search boxes 717.

FIG. 8 represents one embodiment of the Resource Plan UI's 700 Capacity vs. Demand Chart 800. In one embodiment of the invention, the Capacity vs. Demand Chart 800 is a flash chart that displays a bar graph detailing for twelve months the demand based on the allocation entries from the Allocations UI 500 and the capacity based on the capacity entries from the Capacity UI 400.

FIG. 9 represents one embodiment of the Resource Plan UI's 700 Hours & Cost View 900. This report is essentially the same as the Resource Plan Report 710, but it also includes a calculation of cost in addition to the allocations based on the allocated hours multiplied by the resource rates. This grid 910 uses a tree structure that allows the users to drill down into each project to view each group participating in the project. In one embodiment of the invention, the Hours & Cost View 900 lists the ECMS#911, the Initiative or Project 912, the Portfolio 913, the Group 914, the twelve month allocated Hours 915, and the twelve month Cost 916. A user may select the drill-down button 920 to examine more detail relating to the Hours 915 and Cost 916 for each specific group involved in each Initiative or Project 912.

FIG. 10 represents one embodiment of the Resource Plan UI's 700 Roll-Up 1000. The Roll-Up grid 1010 lists the Group 1011, the Hours 1012 over a twelve month period, and the Total hours 1013 for the twelve month period. The Roll-Up is a Full Time Employee ("FTE") head count capture of the difference between the capacity and demand as entered by the Resource Managers in the Capacity UI 400 and Allocation UI 500. By displaying the difference between the capacity and the demand, the Roll-Up would let a Resource Manager know right away if there is a need for or an abundance of resources associated with a project or group. This grid 1010 uses a tree structure that allows the users to select the drill-down buttons 1020, in order to view each Group 1011 and drill-down into each resource type to view the associated FTE Head Count 1012. The Capacity 1100 and Demand (also known as Allocations) 1200 have the same lay-out as the Roll-Up 1000, but disclose the FTE Count as they relate to the resource capacity and the project demand.

FIG. 11 illustrates one embodiment of the Resource Plan UI's 700 Resource Level View 1300. The Resource Level View 1300 report is similar to the Resource Plan report 710, but it is viewed at a Resource Level, not a Project level. The Resource Level View grid 1310 contains a list of the Groups/Resources 1311, the ECMS number 1312, the associated Projects 1313, and the twelve month Resource Allocation 1314. For each resource 1311, the Resource Level View 1300 displays all of the projects 1313 that resources 1311 have been allocated to and the corresponding allocations 1314 for a twelve month period. This grid uses a tree structure that allows the users to drill-down into each resource and view each associated project.

FIG. 12 illustrates one embodiment of the Resource Plan UI's 700 Remaining Allocations 1400 report. The Remaining Allocations report grid 1410 lists the Group 1411, the Resource Name 1412, and the twelve month Resource Allocation data 1413. The report provides a list of all the resources and the remaining allocations that can be assigned to other projects for each resource over a twelve month period. The remaining allocations are calculated by multiplying the hours in the month by the difference in the FTE Capacity and the Resource Hours Allocated. This grid 1410 uses a tree structure that allows the users to drill down into each Group 1411 to view the individual available resources within each group.

FIG. 13 illustrates one embodiment of the Resource Plan UI's 700 Fix-bid Report 1500. The Fix-bid Report grid 1510 lists the Project, Group, and Resources 1511, the Milestone 1 Cost 1512, the Milestone 2 Cost 1513, the Milestone 3 Cost 1514, the Milestone 4 Cost 1515, and the Total Fix-bid Cost 1516. The report essentially captures all of the Resource Managers' entries into the Fix-bid UI 600. This grid 1510 uses a tree structure that allows the users to select the drill-down buttons of each project and group to examine more detail related to the individual resources assigned to each project within each group.

FIG. 14 illustrates one embodiment of the Resource Plan View Settings 1600. The Settings zone 1610 contains a list of the Available Groups 1611 and the Currently Viewed Groups 1612, the Select Teams dropdown 1614, and a 12 Month Window 1613 to input the first and last months in the twelve month period that a user wants to view. These areas allow a user to narrow down the scope of what is displayed in all of the reporting sections by team and by group. The groups displayed will depend on the team selected, thus allowing multiple teams to maintain track of their groups in SMART. Also, it should be noted that a user will only be able to see a list of teams in the Select Team dropdown 1614 for which they have view privileges. Initially in each report, all of the groups that are allocated to a project are included in the report. However, if a user only wants to examine the allocations related to specific teams or groups, the user may include only those teams and groups in the Select Team dropdown 1614 and Currently Viewed Groups 1612 sections, and the reports will only display information related to those teams and groups. Additionally, the Settings zone 1610 allows a user to select the twelve month window they want to examine in the reports. In this case, the user may enter the desired twelve month period in the 12 Month Window boxes 1613, and the reports will only display the information as it relates to the twelve month period that the user entered.

Specific embodiments of the invention are described herein. Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

What is claimed is:

1. A method for developing a resource plan, the method comprising:

receiving, via a processing device, a user input checking out one or more groups from a datastore, wherein each of the one or more groups is a combination of resources that share a common characteristic and wherein checking out prevents other users from allocating the resources in the group to a project in a resource plan until the group is checked back in, wherein the resources in the group may be checked out but not allocated to the project;

receiving, via the processing device, a user input selecting a resource from a plurality of resources;

determining when the resource is a time and materials resource, wherein a time and materials resource is a form of cost plus pricing in which cost is determined based on the cost of labor and material inputs to a product or service associated with the resource;

receiving, via the processing device, a user input selecting a project from a plurality of projects;

receiving, via the processing device, a user input associating the resource with the project;

displaying, via a display device, an available capacity of the selected resource and a demand of the selected project;

receiving, via the processing device, a user input allocating a portion of the capacity of the resource to the associated project;

determining a total cost of the project based on the cost of the time and materials resource and the allocation of the portion of the time and materials resource;

displaying, via the display device, a remaining demand for the project, wherein the remaining demand is the demand reduced by the portion of the capacity of the resource allocated to the project; and displaying, via the display device, a remaining capacity for the resource, wherein the remaining capacity is the capacity reduced by the portion of the capacity of the resource allocated to the project.

2. The method of claim 1, further comprising:
receiving a user input to add a new resource plan to a datastore.

3. The method of claim 1, further comprising:
receiving a user input to add a new resource to a datastore.

4. The method of claim 3, wherein receiving a user input to add a new resource to the datastore, further comprises:
receiving a user input to add a name of the resource, a resource identification number, a resource type, a vendor type, or a fix-bid time frame associated with the resource.

5. The method of claim 1, further comprising:
receiving a user input to add a project to the resource plan.

6. The method of claim 1, further comprising:
receiving a user input allocating a cost for a milestone in a project.

7. The method of claim 1, further comprising:
receiving a user input defining a unit of measurement to the resource's capacity that is being allocated to the project in the resource plan.

8. The method of claim 1, further comprising:
receiving a user input defining a time period over which the resource's capacity will apply.

9. The method of claim 1, wherein receiving a user input associating the resource with the project, further comprises:
dragging the resource out of the plurality of resources; and
dropping the resource into the project or into a group in the resource plan.

10. A system for allocating resources to projects, wherein the system allows a user to develop and review a resource plan, the system comprising:
a computer-readable medium providing computer-readable instructions;
a display device;
a user interface device; and
a processor operatively coupled to the display device, the user interface device, and the computer-readable medium, wherein the processor is configured to execute the computer-readable instructions to:
use the user interface device to receive a user input to check out the resource plan, wherein checking out prevents other users from making changes to the resource plan until the resource plan is checked back in;
use the user interface device to receive a user input to check out one or more groups, wherein each of the one or more groups is a combination of resources that share a common characteristic and wherein checking out prevents other users from allocating the group's resources to a resource plan until the group is checked back in, wherein the resources in the group may be checked out but not allocated to the project;
determine when at least one of the resources is a time and materials resource, wherein a time and materials resource is a form of cost plus pricing in which cost is determined based on the cost of labor and material inputs to a product or service associated with the resource;
use the user interface device to receive a user input selecting a resource from a plurality of resources and a project from a plurality of projects;
use the user interface device to receive a user input associating the resource with the project;
determine a total cost of the project based on the cost of the time and materials resource and the allocation of the portion of the time and materials resource;
use the display device to display an available capacity of the selected resource and a demand of the selected project;
use the user interface device to receive a user input allocating a portion of the capacity of the resource to the associated project;
use the display device to display a remaining demand for the project, wherein the remaining demand is the demand reduced by the portion of the capacity of the resource allocated to the project; and
use the display device to display a remaining capacity for the resource, wherein the remaining capacity is the capacity reduced by the portion of the capacity of the resource allocated to the project.

11. The system of claim 10, wherein the processor is configured to execute the computer-readable instructions to:
use the user interface device to receive a user input to define a unit of measurement for the resource capacity being allocated to the resource plan.

12. The system of claim 10, wherein the processor is configured to execute the computer-readable instructions to:
use the user interface device to receive a user input to define a time period over which the resource plan will occur.

13. The system of claim 10, wherein the processor is configured to execute the computer-readable instructions to:
use the user interface device to receive a user input to add resources to the available resources in a group, wherein adding resources comprises adding a name of the resource, a resource identification number, a resource type, a vendor type, or a fix-bid timeframe for the resource.

14. The system of claim 10, wherein the processor is configured to execute the computer-readable instructions to:
use the user interface device to receive a user input to edit or delete a resource stored in the resource plan.

15. The system of claim 10, wherein the processor is configured to execute the computer-readable instructions to:
use the user interface device to receive a user input to allocate a plurality of resources categorized in a group to the project in the resource plan.

16. The system of claim 10, wherein the processor is configured to execute the computer-readable instructions to:
use the user interface device to receive a user input to allocate a cost associated with the resource or a group of resources to a milestone in the project, wherein the cost will determine the capacity allocated for the resource or the group of resources to the project milestone.

17. The system of claim 10, wherein the processor is configured to execute the computer-readable instructions to:
use the display device to display information about the resource plan;
wherein the information is the project and associated resources for the resource plan; and
wherein the display is a user interface of a resource plan summary, a capacity vs. demand chart, a resource hours and cost view, an allocation roll-up, a capacity summary, a demand summary, a resource level view, a remaining allocation view, or a fix-bid summary.

18. The system of claim 10, wherein the processor is configured to execute the computer-readable instructions to:
use the display device to display information about the resource plan;
use the user interface device to receive inputs to select the groups to be displayed or the time period to be displayed; and
wherein the groups or time period inputted will determine what information is displayed in a resource plan summary, a capacity vs. demand chart, a resource hours and cost view, an allocation roll-up, a capacity summary, a demand summary, a resource level view, a remaining allocation view, or a fix-bid summary.

19. The system of claim 10, wherein the processor is configured to execute the computer-readable instructions to:
use the user interface device to receive a user input for allocating the resource to the project by dragging and dropping the resource into the desired project.

20. A computer program product for developing and reviewing a resource plan, the computer program product comprising at least one computer-readable medium having computer-readable program code portions embodied therein, the computer-readable program code portions comprising:
an executable portion configured for receiving a user input checking out one or more groups from a datastore, wherein each one of the one or more groups is a combination of resources that share a common characteristic and wherein checking out prevents other users from allocating the resources in the group to a project in a resource plan until the group is checked back in, wherein the resources in the group may be checked out but not allocated to the project;
an executable portion configured for determining when at least one of the resources is a time and materials resource, wherein a time and materials resource is a form of cost plus pricing in which cost is determined based on the cost of labor and material inputs to a product or service associated with the resource;
an executable portion configured for receiving inputs from a user through a user interface device for allocating the resource to the project within the resource plan;
an executable portion for determining a total cost of the project based on the cost of the time and materials resource and the allocation of the portion of the time and materials resource;
and
an executable portion configured for generating a dashboard through a display device for displaying the capacity associated with the resource and the demand associated with the projects;
an executable portion configured for receiving inputs from the user through the user interface device for allocating a monetary amount to a group to complete a milestone of the project to the project.

21. The computer program product of claim 20, further comprising:
an executable portion configured for receiving inputs from the user through the user interface device for allocating the resource's capacity to a project.

22. The computer program product of claim 20, further comprising:
an executable portion configured for generating the dashboard through the display device for displaying a resource plan report, wherein the resource plan report comprises at least one of a resource plan summary, a capacity vs. demand chart, a resource hours and cost view, an allocation roll-up, a capacity summary, a demand summary, a resource level view, a remaining allocation view, or a fix-bid summary.

23. The computer program product of claim 20, further comprising:
an executable portion configured for receiving inputs from the user through the user interface device for allocating the resource to the project by dragging and dropping the resource into the project within the resource plan.

24. The computer program product of claim 20, wherein the computer program product is a web-based collaborative program that allows a plurality of users to develop and review a resource plan over the web.

\* \* \* \* \*